(12) United States Patent
Seitz (10) Patent No.: US 6,758,595 B2
(45) Date of Patent: Jul. 6, 2004

(54) IMAGING PYROMETER

(75) Inventor: Peter Seitz, Urdorf (CH)

(73) Assignee: Csem Centre Suisse d' Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 10/221,639

(22) PCT Filed: Mar. 7, 2001

(86) PCT No.: PCT/CH01/00146

§ 371 (c)(1),
(2), (4) Date: Sep. 13, 2002

(87) PCT Pub. No.: WO01/69192

PCT Pub. Date: Sep. 20, 2001

(65) Prior Publication Data

US 2003/0108083 A1 Jun. 12, 2003

(30) Foreign Application Priority Data

Mar. 13, 2000 (EP) ............................................. 00810207

(51) Int. Cl.$^7$ .......................... G01K 3/00; G01K 13/00; G01J 5/00
(52) U.S. Cl. ........................ 374/137; 374/121; 374/141
(58) Field of Search ................................ 374/137, 141, 374/124, 121, 120; 250/332, 339.05, 330, 339.02, 338.3

(56) References Cited

U.S. PATENT DOCUMENTS

| | | | | |
|---|---|---|---|---|
| 3,781,558 A | * | 12/1973 | Anderson | .................... 250/332 |
| 4,365,307 A | * | 12/1982 | Tatsuwaki et al. | .......... 364/557 |
| 4,413,324 A | | 11/1983 | Tatsuwaki et al. | |
| 4,423,325 A | * | 12/1983 | Foss | ............................ 250/332 |
| 4,607,963 A | * | 8/1986 | Ulrickson | .................... 374/121 |
| 4,687,344 A | | 8/1987 | Lillquist | |
| 4,910,401 A | * | 3/1990 | Woods | ........................ 250/332 |
| 4,979,133 A | * | 12/1990 | Arima et al. | ................ 374/121 |
| 5,011,295 A | * | 4/1991 | Krishnan et al. | ............ 374/126 |
| 5,219,226 A | * | 6/1993 | James | .......................... 374/124 |

(List continued on next page.)

FOREIGN PATENT DOCUMENTS

| | | | |
|---|---|---|---|
| EP | 0 481 653 A2 | 4/1992 | |
| JP | 56039433 A | * 4/1981 | ................. 374/124 |
| JP | 61173124 A | * 8/1986 | ................. 250/332 |
| JP | 61186826 A | * 8/1986 | ................. 374/124 |
| JP | 01174921 A | * 7/1989 | ................. 374/124 |
| WO | WO 99/27336 | 6/1999 | |

*Primary Examiner*—Christopher W. Fulton
*Assistant Examiner*—Mirellys Jagan
(74) *Attorney, Agent, or Firm*—Rankin, Hill, Porter & Clark LLP (57) ABSTRACT

In the imaging pyrometer, at least three types of pixels (L, S, V) for sensing electromagnetic radiation in at least three different spectral ranges are arranged in a mosaic pattern. In a neighborhood, there are two types of pixels with relatively narrow spectral sensitivity ranges in the infrared (IR), a first one (L) for sensing longer IR wavelengths and the other one (S) for shorter IR wavelengths. Additionally, there is a third pixel type (V) present for receiving electromagnetic radiation in a broader band such as the visible part of the electromagnetic spectrum. This is preferably realized by placing a mosaic filter pattern directly on pixels of an appropriate optoelectronic image sensor, for example by evaporation and photolithographic definition. The pyrometer makes it possible to measure two images of a scene simultaneously and in perfect geometric registration: a reliable temperature map, based on the two-wavelength pyrometric measurement technique, and a high-resolution picture of the scene, for example in the visible spectral range. The dynamic range for the temperature map measurement and the simultaneous picture acquisition are be increased compared to the prior art, so that both images are acquired under favorable signal-to-noise conditions, and the measurable temperature range between about 350° C. and several 1000° C. is accessible without additional neutral density filters or aperture stops.

21 Claims, 3 Drawing Sheets

U.S. PATENT DOCUMENTS

| | | |
|---|---|---|
| 5,272,340 A | 12/1993 | Anbar |
| 5,337,081 A | 8/1994 | Kamiya et al. |
| 5,580,172 A * | 12/1996 | Bhardwaj et al. ............ 374/137 |
| 5,661,817 A | 8/1997 | Hatlestad et al. |
| 5,822,222 A | 10/1998 | Kaplinsky et al. |
| 5,841,126 A * | 11/1998 | Fossum et al. ........... 250/208.1 |
| 5,920,345 A * | 7/1999 | Sauer ......................... 348/308 |
| 5,963,311 A | 10/1999 | Craig et al. |
| 6,222,111 B1 * | 4/2001 | Kern .......................... 374/127 |
| 6,369,737 B1 * | 4/2002 | Yang et al. .................. 341/155 |
| 6,532,040 B1 * | 3/2003 | Kozlowski et al. ......... 348/241 |

* cited by examiner

IMAGING PYROMETER

BACKGROUND OF THE INVENTION

1. Field of the Invention

This invention relates to an imagine pyrometer and a method for simultaneously determining surface temperature distributions and images of remote objects.

2. Description of Related Art

In machine vision and automatic manufacturing, high-resolution temperature maps and visible imagery must simultaneously be acquired that need to be in perfect geometric registration. In such applications, the readout speed of a complete frame or a sub-game must typically be 10 Hz or faster and the temperature range should be between 350° C. and several 1000° C.

U.S. Pat. No. 4,413,324 (Tatsuwaki et al.) describes an imaging pyrometer that makes use of an image pickup device whose pixels are covered with a mosaic of two types of infrared transmissive filters. The signals of two neighboring pixels are converted into a temperature value as in conventional two-wavelength pyrometers. This imaging pyrometer is capable of acquiring a two-dimensional temperature map of a scene. However, no provisions are foreseen to accommodate a large range of temperatures, requiring an unusually large dynamic range of the filtered pixels. Additionally, the temperature map is the only pictorial information acquired, and no visual image of the scene can be taken, for example in the visible spectral range, as is often required in machine vision for high-resolution optical inspection.

International publication No. WO-99/27336 (Koltunov et al.) describes an extension of U.S. Pat. No. 4,413,324 (Tatsuwaki et al.). The number of different types of infrared transmissive filter in a pixel is increased from 2 to N, where N is a natural number. This makes it possible to determine two-dimensional maps not only of the temperature but also the emissivity. As in U.S. Pat. No. 4,413,324 (Tatsuwaki et al.), no provision is foreseen to measure anything other than the temperature and emissivity map, or to accommodate a large range of temperatures requiring a usually large dynamic range of the filtered pixel in the filter mosaic.

U.S. Pat. No. 4,687,344 (Liliquist et al.) describes an imaging pyrometer that partially overcomes the limitations of Tatsuwaki et al. This device also consists of a single image pickup device, but it is completely covered with a single infrared transmission filter. Depending on the temperature range of interest, additional neutral density filters can be inserted to increase the effective dynamic range and therefore the temperature measurement range of the imaging pyrometer. However, since only one type of infrared filter is used, no two-wavelength correction can be made for surface properties of the emitting objects such as varying emissivity or surface finish, potentially leading to incorrect temperature readings. As in Tatsuwaki et al., only a temperature map is produced without any visible image.

U.S. Pat. No. 5,337,081 (Kamiya et al.) describes a triple-view imaging pyrometer, making use of a single image pickup device. The radiation incident from a scene is separated in two or more wavelength bands, and the resulting images of different wavelength bands are imaged onto different areas of the same single image pickup device. In this way, the registration problem is solved that exists when several different image pickup devices are used as described in previous patents. In this way, one can for example simultaneously acquire two-wavelength data for the calculation of the temperature map, as well as a visible image of the scene. However, the necessary optics to achieve the wavelength band separation and image combination for a single image pickup device is not trivial.

U.S. Pat. No. 5,963,311 (Craig et al.) describes an imaging pyrometer that makes use of a single image pickup device. In similar fashion as in Kamiya et al., beam splitting arid image combination optics is used to separate two wavelength ranges in the incoming radiation and to combine the two images onto one single image pickup device. The disclosed optical arrangement assures that the two images are in good geometrical registration on the image sensor. The two images are then used for conventional two-wavelength pyrometric determination of the temperature trap. However, the required optics is not trivial, and only a temperature map is acquired in this method.

SUMMARY OF THE INVENTION

It is an object of the present invention to provide an imaging pyrometer and a method for measuring surface temperature distributions of remote objects that overcome the above limitations of the prior art. More particularly, the invention shall solve the following two major problems:

(a) Two images of a scene shall be measured simultaneously and in perfect geometric registration: a reliable temperature map, based on the two-wavelength pyrometric measurement technique, and a high-resolution picture of the scene, for example in the visible spectral range.

(b) The dynamic range for the temperature map measurement and the simultaneous picture acquisition shall be increased compared to the prior art, so that both images are acquired tinder favorable signal-to-noise conditions, and the measurable temperature range between about 350° C. and several 1000° C. is accessible without additional neutral density filters or aperture stops.

The basic idea of the invention is to arrange at least three types of pixels for sensing electromagnetic radiation in at least three different spectral ranges in a mosaic pattern. This pattern has the following properties. In a neighborhood, there are two types of pixels with relatively narrow spectral sensitivity ranges in the infrared (IR), a first one (L) for sensing longer IR wavelengths and the other one (S) for shorter IR wavelengths. Additionally, there is a third pixel type (V) present for receiving electromagnetic radiation in a spectral range which is different from the sensitivity ranges of the first (L) and second (S) pixel types. ("Different" means in this connection that there are wavelengths in one spectral range that are not contained in the other spectral range.) This third pixel type V has the property of being densely arranged and regularly spaced, so that high-resolution, finely sampled images of the scene can be measured through these pixels, without being influenced by the measurements of the IR-sensitive pixels L, S. The sensitivity range of the third pixel type (V) is preferably adapted to the illumination of the scene to be imaged. Preferably, it is broader than the first (L) and second (S) sensitivity range, e.g., at least three times broader, and typically lies within or covers the visible part of the electromagnetic spectrum. Alternatively, it also may be relatively narrow, e.g., for cases where the scene is illuminated by a narrow-band light source such as a light emitting diode (LED).

In a preferred embodiment of the pyrometer according to the invention, a mosaic filter pattern is placed directly on pixels of an appropriate optoelectronic image sensor, for example by evaporation and photolithographic definition.

Such color filters are well known in the art and may be, e.g., dielectric layer stacks, dye filters and/or diffractive filters (cf. K. Knop. "Color Pictures Using the Zero Diffraction Order of Phase Grating Structures", Optics Communications. Vol. 18, No. 3, 298–303, 1976). The first and the second type of IR-sensitive pixels L, S are related to two different types of IR transmission filters, a first one transmitting longer IR wavelengths, with a maximum transmission towards the longest wavelength where the image sensor is still sensitive, the other one at shorter IR wavelengths. The third type of pixels V can be related to a third type of filters transmitting in the visible part of the electromagnetic spectrum, or it could yield maximum sensitivity by avoiding a filter deposition on the corresponding pixels.

As an alternative, one can also use more than one imaging, filter type $V_1 \ldots V_n$, each of which has a different central wavelength and possibly a different spectral width.

To increase the dynamic radiometric and temperature range, and to adapt the signal levels of the differently sensitive pixels (L, S and V), the exposure times are adjusted to the actual radiation levels: if the temperature is high, then a relatively short exposure time is required to bring the L and S signals to a sufficiently high level. At 1000° C., for example, exposure times of a few hundred microseconds are sufficient for a typical silicon-based CCD or CMOS image sensor. At 400° C., however, exposures of several tens of milliseconds are required to reach the same signal level. Depending on the (additional) illumination level, the optimum exposure for the V pixels might be higher or lower than the one for the L and S pixels.

Depending on the type and capabilities of the solid-state image sensor employed, different means are available to adapt the exposure tine to the brightness level of the radiation:

(i) In a charge-coupled device (CCD) image sensor (of frame-transfer, interline-transfer or field-interline,transfer architecture), all pixels have the same exposure time. One can employ, therefore, two or more complete image acquisition cycles, each with its own exposure time. Two different exposure times are required when S and L pixels show similar signal levels and only V has a different signal level. Three exposure times are required when S, L and V pixels show all different signal levels. More than three exposure times are appropriate when S, L and $V_1$ all show different signal levels, in the case of more than one V channel.

(ii) In a complementary-metaloxide-semiconductor (CMOS) image sensor or an active-pixel sensor (APS), it is possible to have a different exposure time for each imager line, for each column or even for each pixel. With such an image sensor type, it is not necessary to acquire three different images: it is rather possible to give each pixel type (S, L or V) its optimum exposure time, depending on temperature and illumination conditions. Since CMOS or APS image sensors offer non-destructive readout, this can be accomplished, for example, by reading out pixels which need short exposure times earlier than pixels with a long exposure time, relative to a reset signal given to the pixels.

The imaging pyrometer according to the invention has, among others, the following possible applications:

Laser welding. For controlling the laser power that must be high initially, until the surface of the object starts to become liquid and increases its absorbance suddenly, when the laser power must be reduced within a few 100 $\mu$s so as not to evaporate the material but rather keep it in the liquid phase.

Laser drilling and cutting. For controlling the intensity of the laser used in drilling and cutting processes, and for advancing the object at the optimum speed. This can be done by observing the temperature around the cutting position.

Gas or electric welding. For controlling the speed at which an object advances under a gas or electric welding torch. The temperature is a measure for the optimum speed with which the welding can proceed.

Hot-air fusion of plastic materials. Plastic materials can be fused ("welded") by hot-air guns. In order not to burn the plastics, it is important to control the temperature of the hot air and the advancement of the materials to be welded. By observing the temperature map across the width of the hot air, dangerous hot spots and potential burns can be detected early and avoided.

Combustion process monitoring. The imaging pyrometer can observe simultaneously the burning pattern of a flame ("how it dances") and the combustion temperature. This information can be used to optimize the combustion process for lower pollutant emission and higher burner efficiency.

Combustion motor optimization. By observing at the same time the surface temperatures of parts in an internal combustion motor (e.g., a Diesel engine) and the precise motion of the different motor elements, the geometry of the engine and details of the combustion process can be optimized.

Monitoring of heat treatment. Various industrial processes call for a heat treatment that often needs to be uniform. An example is the so-called rapid thermal annealing (RTA) employed in the semiconductor industry. Since this is realized with an array of lamps, active lamp control and RTA optimization with the disclosed imaging pyrometer is possible.

Glass, metal and ceramic processing. Industrial processes that make use of the controlled melting, forming and cooling of substances (such as glass, metal or ceramics) sometimes result in products that have internal stress and are therefore prone to failure because the cooling process was not uniform and slow enough. Closed-loop control of such melting-forming-cooling processes is possible with the imaging pyrometer.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

FIGS. 1–4 schematically illustrate four different types of pixel arrangements in a pyrometer according to the invention. The pyrometer is based on an appropriate solid-state image sensor, preferably an Si sensor, comprising a plurality of pixels. There are at least three different types of pixels:

Type L: sensitive at longer IR wavelengths;

Type S: sensitive at shorter IR wavelengths; and

Type V: sensitive in a further, preferably broader spectral band, e.g., in the visible part of the electromagnetic spectrum.

The different sensitivities are preferably achieved by coating the sensitive areas of the pixels by a mosaic of appropriate filters. The pixel arrangements are two-dimensional patterns consisting of a periodic repetition of a unit cell. The unit cell, marked in gray in FIGS. 1–4, comprises all pixel types involved in the respective pyrometer.

Figure 1:
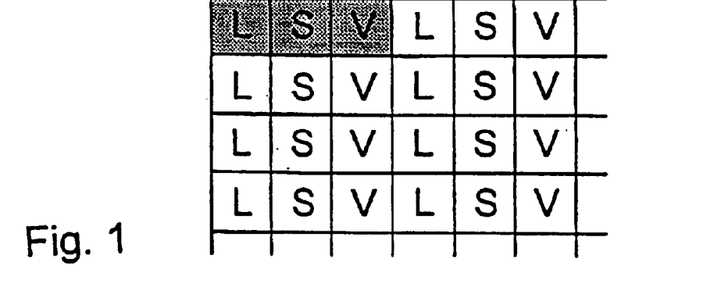
FIGS. 1–4 show various pixel arrangements in a pyrometer according to the invention.
Figure 2:
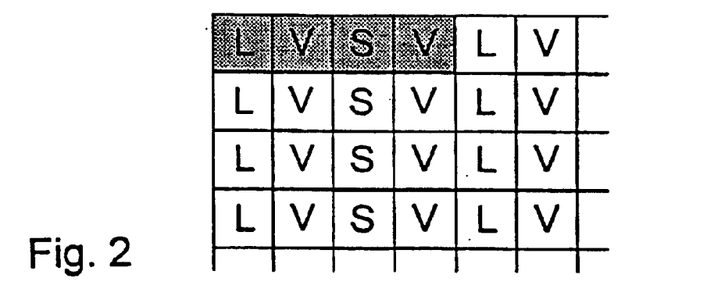
Figure 3:
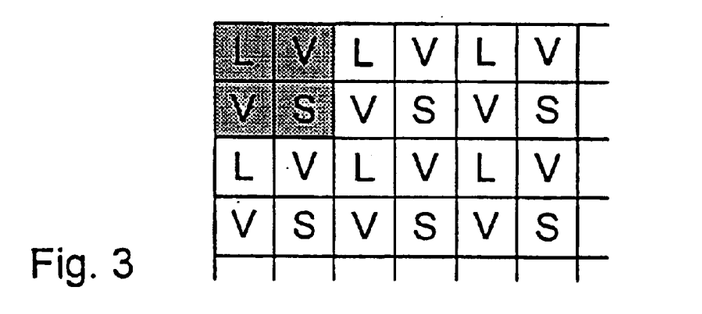
Figure 4:
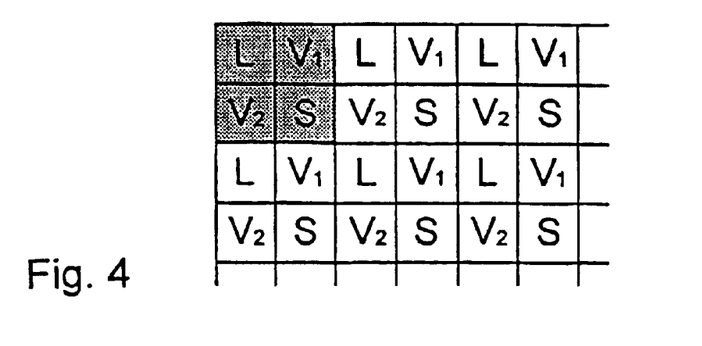

FIG. 1 shows a pixel arrangement with a 1×3 unit cell (defined, e.g., by a stripe filter) and three different pixel types L, S and V. FIG. 2 shows a pixel arrangement with a 1×4 unit cell (defined, e.g., by a stripe filter) and three different pixel types L, S and V. FIG. 3 shows a preferred pixel arrangement with a 2×2 unit cell (defined, e.g., by a mosaic filter) and three different pixel types L, S and V. It is noted that, in the pixel arrangements illustrated in FIGS. 1–3, a surface density of the third pixel type V is greater than the surface density of the first pixel type L and is greater than the surface density of the second pixel type S. FIG. 4 shows a pixel arrangement with a 2×2 unit cell (defined, e.g. by a mosaic filter) and four different pixel types L, S, $V_1$ and $V_2$.

Figure 5:
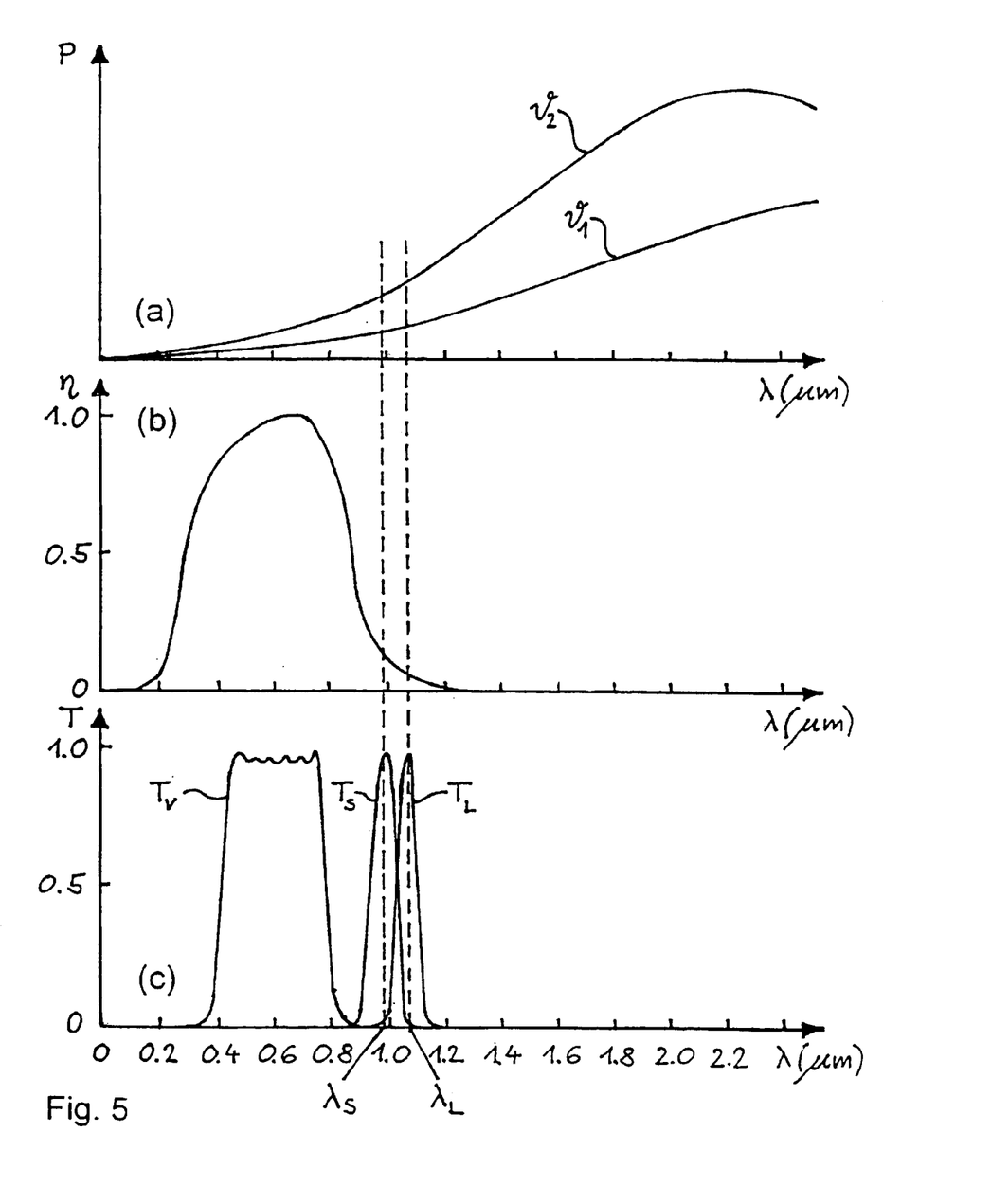
FIG. 5 shows a graphical representation of the wavelength dependencies of (a) the power radiated by a black body, (b) the spectral sensitivity of Si and (c) sensitivities of the various pixel types of the pyrometer according to the invention.

FIG. 5 illustrates the functioning of an Si-based pyrometer according to the invention with three different filter types. FIG. 5(a) shows a graphical representation of the power $P(\vartheta,\lambda)$ radiated by a black body at a given temperature $\vartheta$ versus the wavelength $\lambda$ according to Planck's radiation law $$dP(\vartheta, \lambda) = \frac{2hc^2}{\lambda^5} \frac{A}{e^{hv/k\lambda(\vartheta-\vartheta_n)} - 1} d\lambda.$$

where $dP(\vartheta, \lambda)$ is the Power radiated in the wavelength range [$\lambda$, $\lambda+d\lambda$]

$d\lambda$ is the wavelength-interval width, $h=6.63 \cdot 10^{-34}$ Js is Planck's constant, $c=3.00 \cdot 10^8$ m/s is the velocity of light in vacuum, $k=1.38 \cdot 10^{-23}$ J/K is Boltzmann's constant, $\vartheta_0=-273.15°$ C.: is the absolute-zero temperature in ° C., and A is the area of the body.

The two curves correspond to two different temperatures $\vartheta_1$ (e.g., $\vartheta_1=350°$ C.) and $\vartheta_2>\vartheta_1$ (e.g., $\vartheta_2=1000°$ C). FIG. 5(b) shows the spectral sensitivity $\eta(\lambda)$ of Si, i.e., of the photosensitive detectors used in this type of pyrometer. This curve is given by the material properties of Si; it starts at about $\lambda \approx 0.2$ µm, reaches its maximum at about $\lambda \approx 0.8$ µm and ends at about $\lambda \approx 1.2$ µm. FIG. 5(c) shows transmission curves $T(\lambda)$ of three exemplified filters used in the pyrometer. A first narrow-band filter L and a second narrow-band filter S transmit, at central wavelengths $\lambda_L \approx 1.06$ µm and $\lambda_s \approx 0.99$ µm, respectively, and have spectral widths of about $\Delta\lambda \approx 0.07$ µm. A third bandpass filter V transmits, e.g., in the entire visible range. i.e., for wavelengths $\lambda_L$ between 0.39 and 0.77 µm; its spectral width of $\Delta\lambda=0.38$ µm is thus about five times larger than that of the first and second filters L, S.

The output signal of each pixel type L, S, V for a given temperature $\vartheta$ is essentially the integral of the product of the functions $P(\vartheta,\lambda)$, $\eta(\lambda)$ and $T(A)$ integrated over the entire spectrum ($0<\lambda<\infty$).

Because transmission bands of the filters L and S are very narrow, the pixels L and S essentially measure the radiated powers $P(\vartheta,\lambda)$ and $P(\vartheta,\lambda_s)$, respectively. From their output signals, processed by suitable electronics, a microprocessor or a computer, the temperature $\vartheta$ is calculated according to a known two-wavelengths-pyrometer algorithm (cf. U.S. Pat. No. 4,413,324 by M. Tatsuwaki et al., "Temperature Pattern Measuring Method and a Device Therefore", col. 6. line 40 ff). In an exemplified algorithm, the ratio l/s of a longer-wavelength filtered pixel value l divided by a shorter-wavelength filtered pixel value s is calculated, and the ratio l/s is fed into a lookup table whose output is the temperature. The contents of this lookup table can be calculated based on Planck's radiation law, the knowledge of the two near-infrared-filter characteristics $T_L(\lambda)$ and $T_s(\lambda)$, and the sensor sensitivity $\eta(\lambda)$. The high-resolution visual image is determined by interpolation between the sampled outputs of the pixels V in the image. This sampling occurs according to known interpolation algorithms such as bilinear interpolation (cf. Th. Pavlidis. "Algorithms for Graphics and Image Processing", Computer Science Press, 1982, Sec. 10.2 "Polynomial Interpolation").

Figure 6:
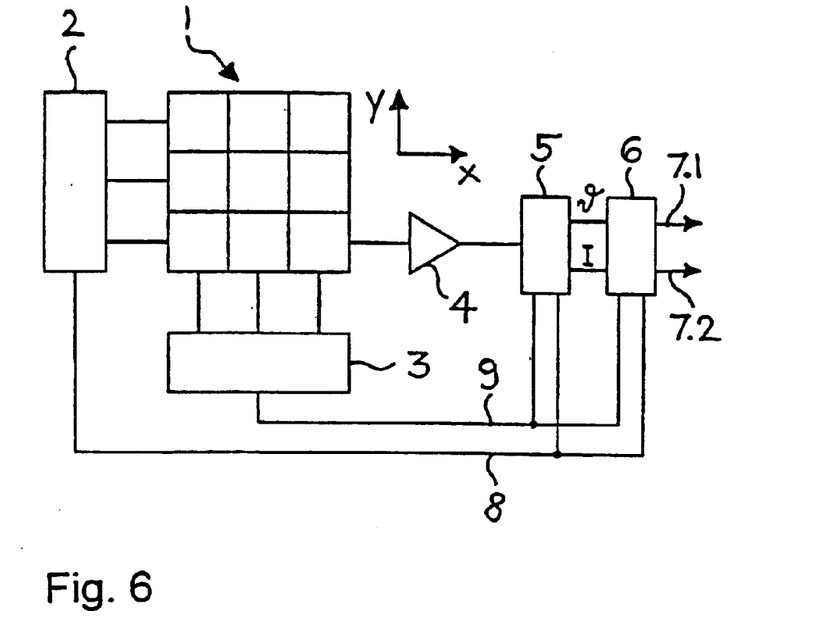
FIG. 6 shows a block diagram of a pyrometer according to the invention with an active feedback.

FIG. 6 shows a block diagram of a pyrometer according to the invention with an active feedback. An image sensor 1 (shown schematically, with only 3×3 pixels) of the CMOS active pixel sensor (APS) type is read out pixel by pixel by applying a row address 8 and a column address 9 to address decoder circuits 2 and 3, respectively. The output signals of the pixels are read out by a buffering circuit 4, and the signals are stored and processed in a pre-processing circuit 5. The pre-processing circuit 5 is responsible for calculating a temperature map $\vartheta(x,y)$ and a visual image l(x,y), where x and y are the coordinates of the sensor plane.

The temperature map $\vartheta(x,y)$ and the intensity image l(x,y) are fed into a processing unit 6 which calculates results and outputs them using one or more channels 7.1, 7.2 of information. This processing unit 6 calculates such information as what is the distribution of the temperature map $\vartheta(x,y)$ to determine non-uniform patterns of potential overheating, development of the high-temperature zone and direction of a potential motion of the high-temperature zone. This information can be used, for example, to regulate the power of a laser used for drilling, cutting or welding, or the optimum path for a welding torch. Based on the same information, it is also possible to determine where interesting sub-images (so called "regions of interest", ROIs) are in the image sensor. The information about interesting ROIs is used to generate sequences of row addresses 8 and column addresses 9, which are used to read out the next ROIs in the image sensor.

Figure 7:
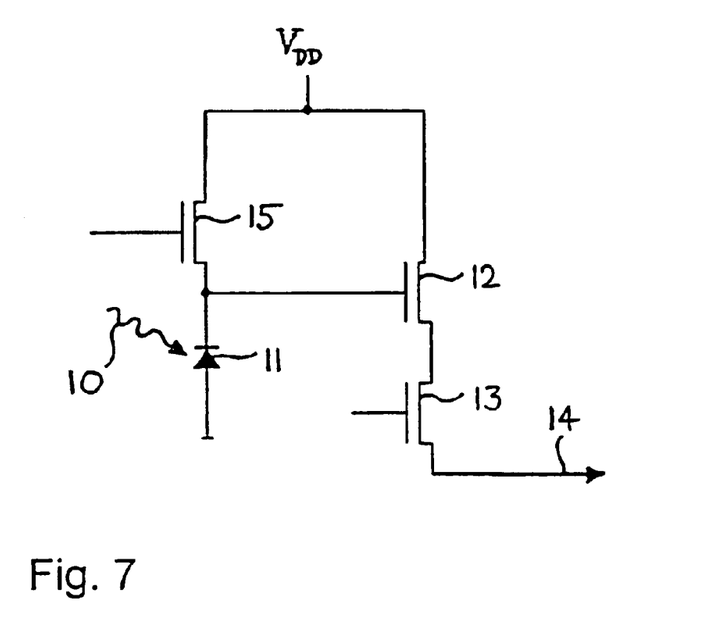
FIG. 7 shows a schematic of an APS pixel circuit of a pyrometer according to the invention.

In FIG. 7, a schematic of a CMOS APS pixel circuit of a pyrometer according to the invention is shown. A CMOS APS circuit consists in its simplest form of a photodiode 11 in which a photocurrent produced by incident electromagnetic radiation 10 discharges the space charge region of the photodiode 11. The resulting voltage is sensed using a source follower transistor 12 connected by a column bus 14 to a load transistor (not shown), which is common for all pixels in, a column. The selection of an individual pixel is realized with a row select transistor 13, which connects a particular source follower transistor 12 with the column bus 14. Since the photodiode 11 is discharged by the photocurrent, it must be periodically recharged to a reference voltage VDD by a so-called reset transistor 15.

Compared to CCD pixels, the CMOS APS pixel shown in FIG. 7 has the big advantage that each pixel can be accessed individually, and it can also be reset individually. This is the key property used for illumination-dependent (active) exposure control: depending on the photocurrent in the photodiode 11, the timing of the reset transistor 15 is adapted so as to produce a signal voltage at the source follower transistor 12 that is neither over-saturated nor hidden in the noise. In addition to exposure, other parameters of the pyrometer may be varied by user input or automatically, such as the readout window, the readout speed or the dynamic range.

By reading out only a selected area ("region of interest", ROI) of the image sensor, the readout speed and the achieved frame rates are significantly increased. A ROI can be a small area, or it can be a one-dimensional curve such as a circle.

The pyrometer image sensor can be sub-sampled to increase readout speed and frame rate. This is achieved by periodically skipping the readout of several of the unit cells illustrated in FIGS. 1–4. In this way, the whole field of view can be sampled for intensity and temperature maps, albeit less densely.

The dynamic range of each pixel can be increased if each pixel is read out twice: once with a short exposure tinge $t_{short}$, and once with a long exposure time $t_{long}$. By adding the second value to the product of the first value multiplied with the ratio ($t_{long}/t_{short}$), a pixel value with larger dynamic range is obtained.

Numerous other embodiments may be envisaged, without departing from the spirit and scope of the invention.

What is claimed is:

1. A method for simultaneously determining surface temperature distributions ($\vartheta(x,y)$) and images of remote objects, comprising the steps of:
    generating one single image of said objects,
    sensing said image essentially simultaneously in a first infrared spectral range, in a second infrared spectral range, which is different from said first infrared spectral range, and in at least one further spectral range, which is different from said first and second infrared spectral ranges, and
    determining a surface the temperature distribution ($\vartheta(x,y)$) from said images sensed in said first and second infrared spectral ranges, wherein a visual image ($l(x,y)$) is determined from said image or images sensed in said at least one further spectral range without being influenced by images sensed in said first and second infrared spectral ranges.

2. The method according to claim 1, wherein said at least one further spectral range lies within or comprises a visible part of the electromagnetic spectrum.

3. The method according to claim 3, wherein at least two images are sensed in two successive readouts and an exposure, a readout window, a readout speed and/or a dynamic range are varied from one readout to the other.

4. The method according to claim 1, wherein the objects are illuminated by light with wavelengths that are at least partially contained in said at least one further spectral range.

5. The method according to claim 1, wherein said image is sensed by an optoelectronic sensor (1) with a plurality of pixels, each pixel sensing with an exposure time, and the exposure times are chosen in dependence upon a radiation level of said image.

6. The method according to claim 5, wherein for at least two different pixels the exposure times for sensing are set individually.

7. The method according to claim 6, wherein said pixels are arranged in rows and columns and for each row, each column or each pixel the exposure times are set individually.

8. Use of the method according to claim 1, in laser welding, laser drilling or cutting, gas or electric welding, hot-air fusion of plastic materials, combustion process monitoring, combustion motor optimization, monitoring of heat treatment or in glass, metal or ceramic processing.

9. An imaging pyrometer for simultaneously determining surface temperature distributions ($\vartheta(x,y)$) and images of remote objects, comprising:
    an optoelectronic sensor (1) with a plurality of pixels of at least three different types (L, S, V) for sensing electromagnetic radiation whereof
        a first pixel type (L) is designed for sensing in a first infrared spectral range a second pixel type (S) is designed for sensing in a second infrared spectral range, which is different from said first infrared spectral range, and,
        at least one further pixel type (V) is designed for sensing in at least a further spectral range, which is different from said first and said second infrared spectral range,
    means (5) for determining a temperature distribution ($\vartheta(x,y)$) from output signals of pixels of said first (L) and second (S) type, wherein the imaging pyrometer comprises means (5) for determining a visual image ($l(x,y)$) from output signals of pixels of said at least one further pixel type (V) without being influenced by the output signals of the pixels of said first (L) and second (S) pixel types, and
    the first, second and at least one further pixel types (L, S, V) are arranged in a mosaic pattern on said optoelectronic sensor.

10. The imaging pyrometer according to claim 9, wherein said at least one further pixel type (V) is senses a visible part of the electromagnetic spectrum.

11. The imaging pyrometer according to claim 9, wherein a surface density of said at least one further pixel type (V) is larger than a surface density of said first pixel type (L) and larger than a surface density of said second pixel type (S).

12. The imaging pyrometer according to claim 9, wherein at least two of said first, second, and at least one further pixel type (L,S,V), comprise filters for electromagnetic radiation, said filters being selected from the group consisting of dielectric layer stacks, dye filters, and diffractive filters.

13. The imaging pyrometer according to claim 12, wherein said first pixel type (L) comprises a first narrow-band transmission filter having a central wavelength ($\lambda_L$)of 1.06 $\mu$m and a spectral width of about 0.07 $\mu$m, and said second pixel type (S) comprises a second narrow-band transmission filter having a central wavelength ($\lambda$s) of 0.99 $\mu$m and a spectral width of about 0.07 $\mu$m.

14. The imaging pyrometer according to claim 9, wherein said mosaic pattern consists of a periodic repetition of a unit cell, which comprises all pixel types (L, S, V) involved in the pyrometer.

15. The imaging pyrometer according to claim 14, wherein said unit cell is a square of 2×2 pixels, two diagonally arranged pixels of the unit cell being of said first pixel type (L) and of said second pixel type (S), respectively, and the other two pixels being of said at least one further pixel type (V, $V_1$, $V_2$).

16. The imaging pyrometer according to claim 9, wherein said optoelectronic sensor is a solid-state image sensor of technology selected from the group consisting of: CCD, CMOS, and APS.

17. The imaging pyrometer according to claim 16, wherein said optoelectronic sensor is a CMOS APS sensor comprising a pixel with a photodiode (11), said photodiode (11) being connected to a source follower transistor (12) and, via a reset transistor (15), to a reference voltage ($V_{DD}$), and wherein said follower transistor (12) is connected to a load transistor via a row select transistor (13).

18. The imaging pyrometer according to claim 9, wherein each pixel senses impinging radiation during an exposure time, and the imaging pyrometer additionally comprises means (15) for setting the exposure times of said pixels in dependence of a radiation level impinging on said pixels.

19. The imaging pyrometer according to claim 18, comprising means (15) for individually setting the exposure times for at least two different pixels.

20. The imaging pyrometer according to claim 19, wherein said pixels are arranged in rows and columns and the imaging pyrometer comprises means (15) for individually setting the exposure times for each row, each column or each pixel.

21. Use of the imaging pyrometer according to claim 9 in laser welding, laser drilling or cutting, gas or electric welding, hot-air fusion of plastic materials, combustion process monitoring, combustion motor optimization, monitoring of heat treatment or in glass, metal or ceramic processing.

* * * * *

UNITED STATES PATENT AND TRADEMARK OFFICE
CERTIFICATE OF CORRECTION

PATENT NO. : 6,758,595 B2
DATED : July 6, 2004
INVENTOR(S) : Seitz

It is certified that error appears in the above-identified patent and that said Letters Patent is hereby corrected as shown below:

Column 7,
Line 42, after "determining" delete "a surface".
Line 53, delete "claim 3" and insert -- claim 1 --.

Signed and Sealed this

Seventh Day of December, 2004

JON W. DUDAS
*Director of the United States Patent and Trademark Office*